April 22, 1930.  T. CARROLL  1,755,499
CASH REGISTER
Filed June 13, 1921  7 Sheets-Sheet 2
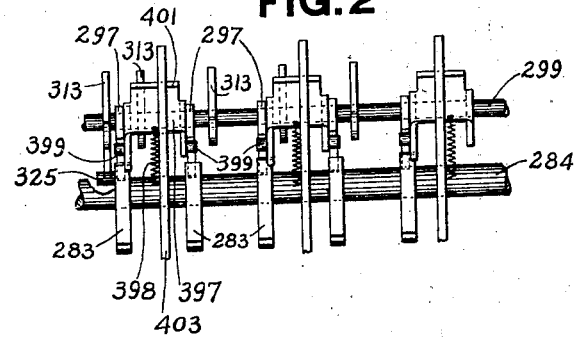
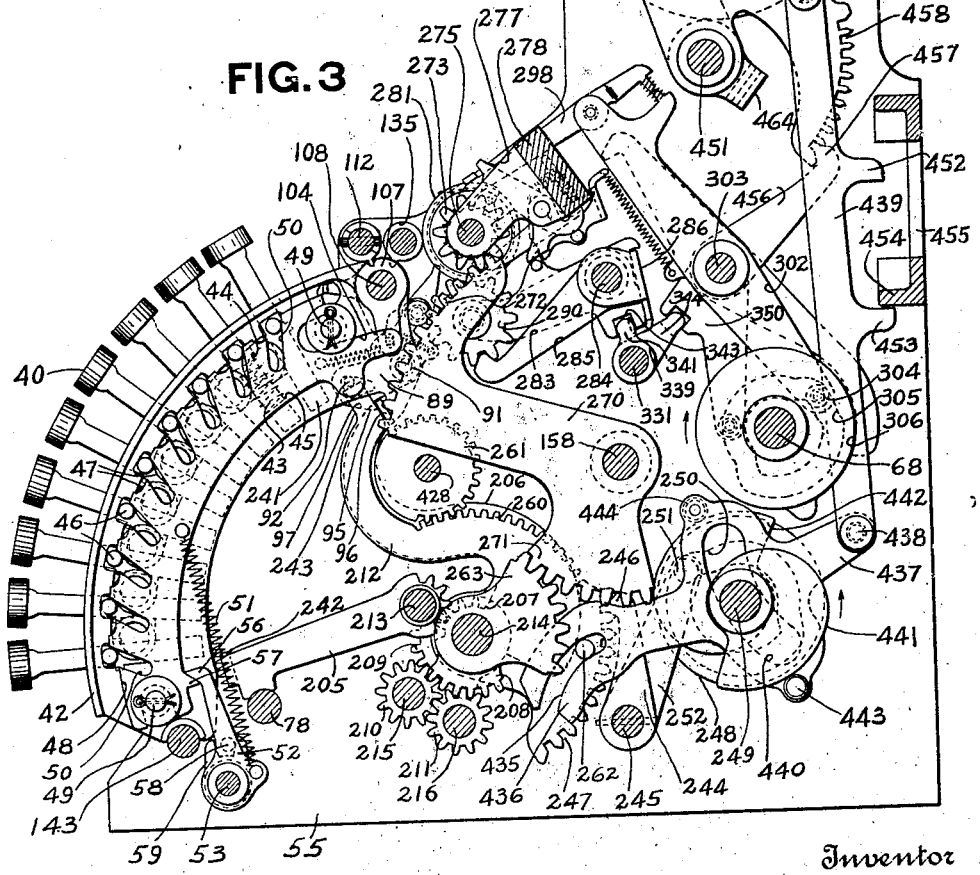

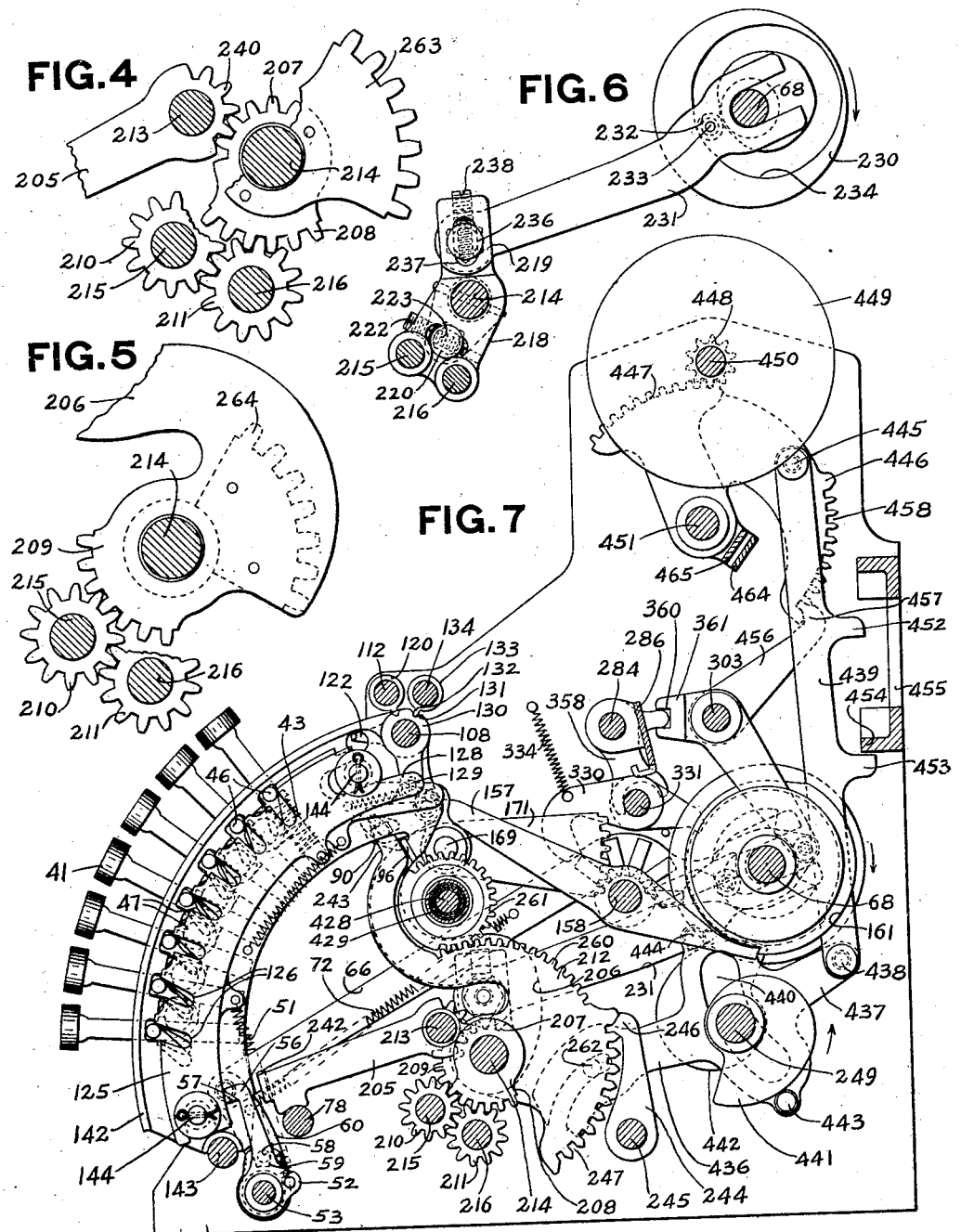

April 22, 1930.    T. CARROLL    1,755,499
CASH REGISTER
Filed June 13, 1921    7 Sheets-Sheet 4

Inventor
THOMAS CARROLL
By Earl Beust
Henry E. Stauffer
Attorneys

April 22, 1930. T. CARROLL 1,755,499
CASH REGISTER
Filed June 13, 1921 7 Sheets-Sheet 5
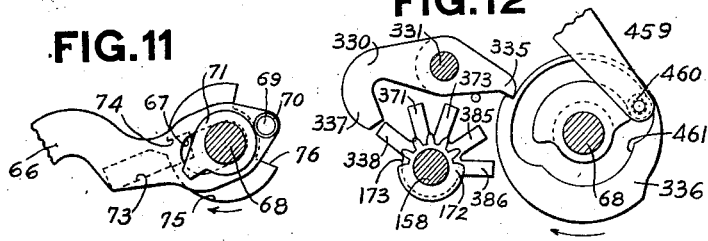
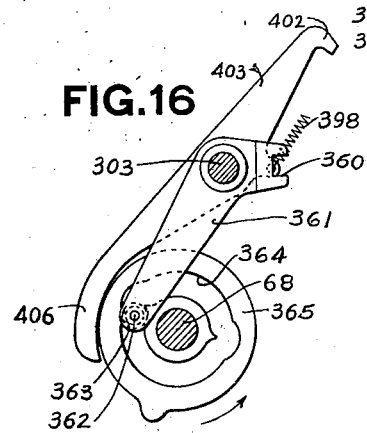
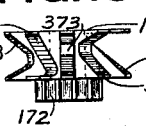
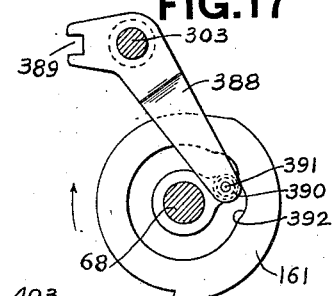
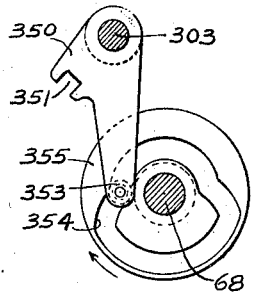
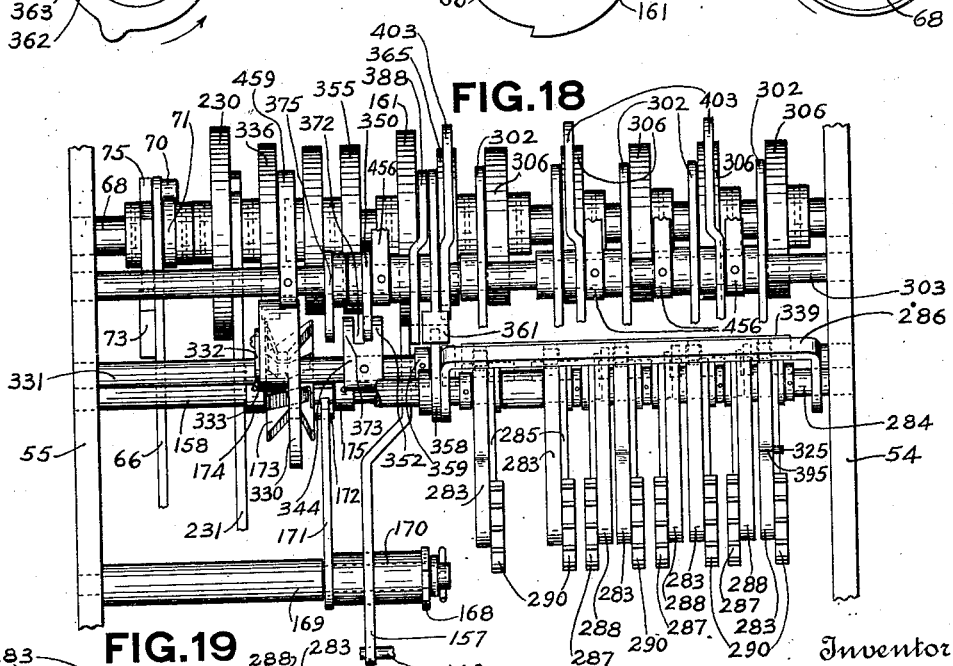
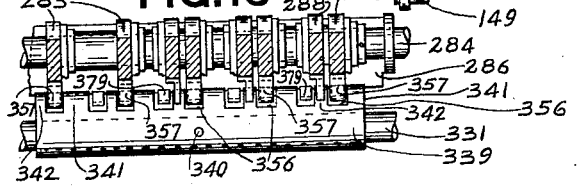

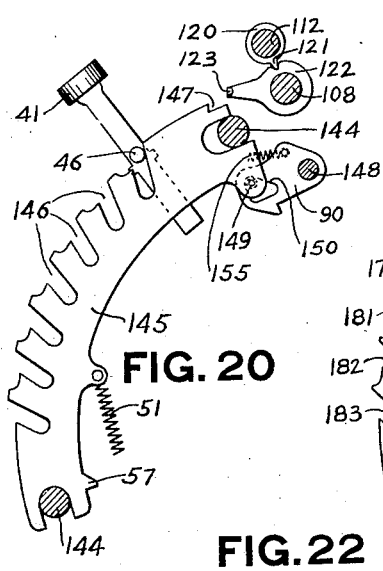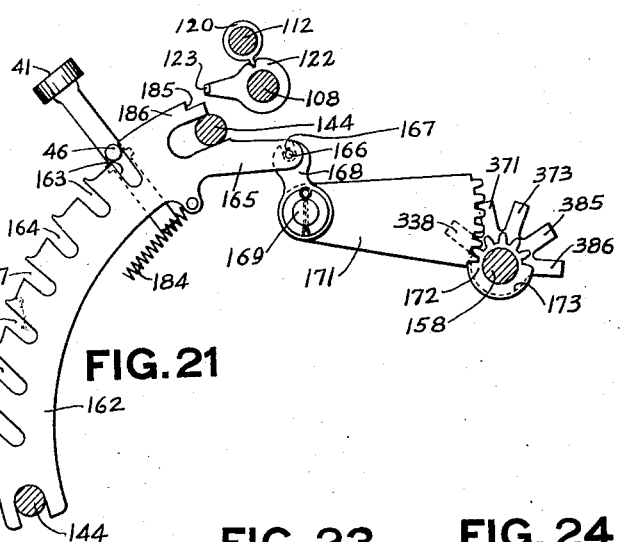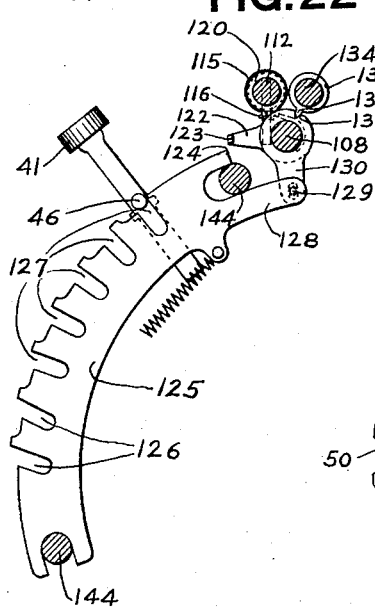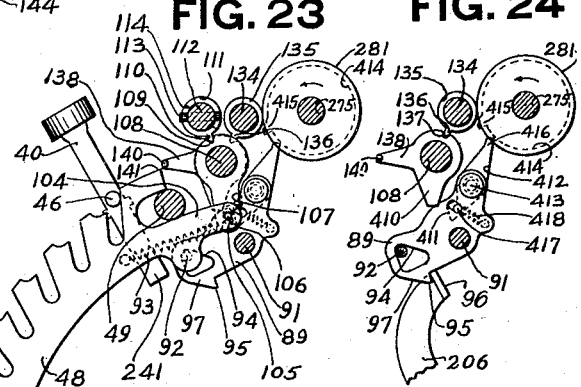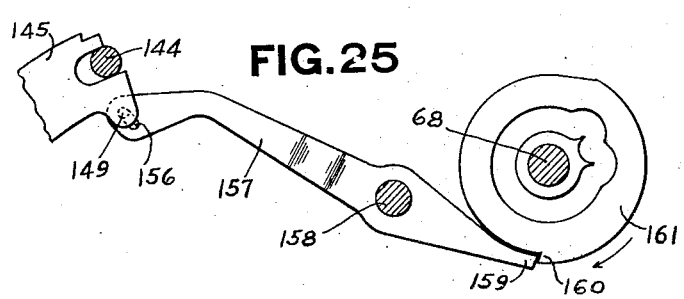

April 22, 1930.    T. CARROLL    1,755,499
CASH REGISTER
Filed June 13, 1921    7 Sheets-Sheet 7
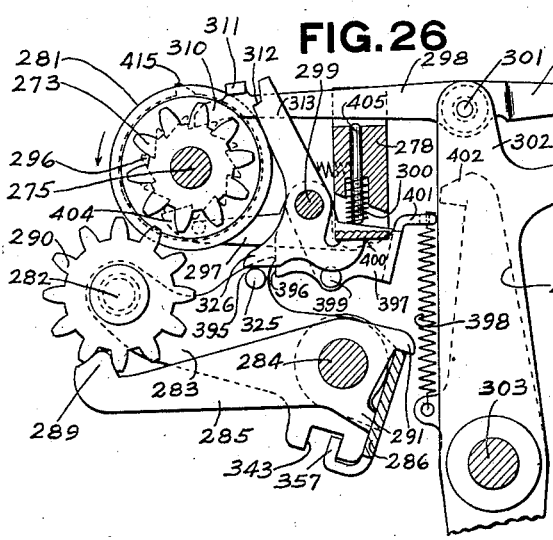
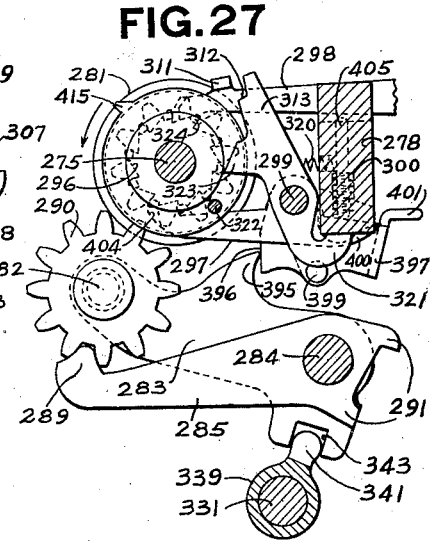
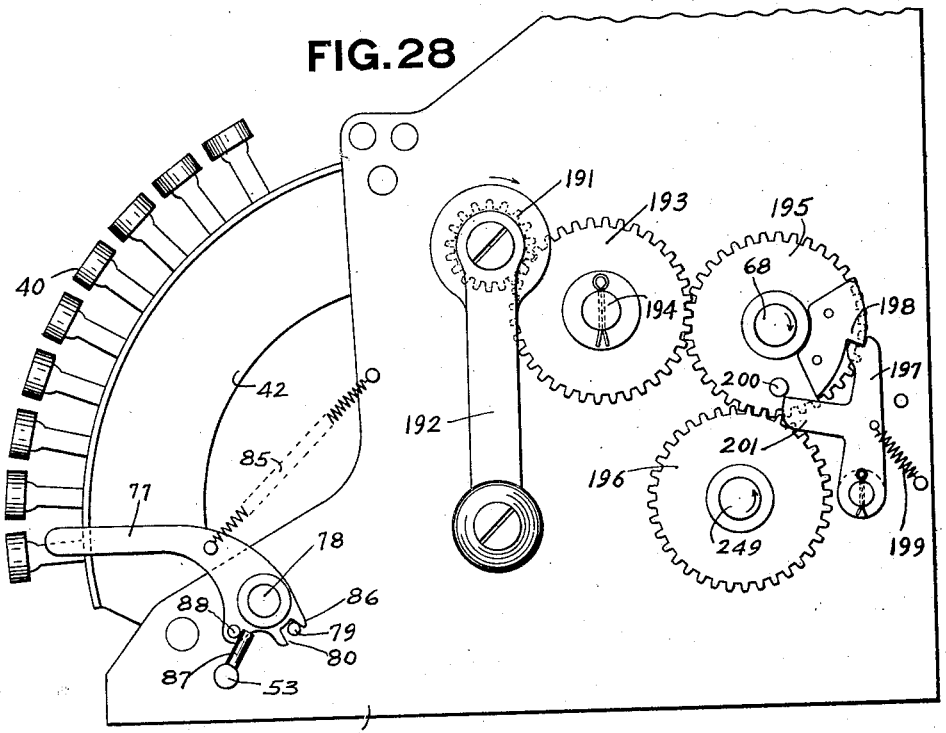
Inventor
THOMAS CARROLL
By Pearl Geist
Henry E Stauffer
Attorneys Patented Apr. 22, 1930

1,755,499

UNITED STATES PATENT OFFICE

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed June 13, 1921. Serial No. 477,138.

This invention relates to improvements in cash registers or accounting machines and particularly to the mechanism for operating the totalizing, printing and indicating devices.

One of the objects of this invention is to provide a simplified form of differential mechanism including complementary movable members controlled by press-in keys, and means whereby the differential mechanism is positively connected with the main operating mechanism.

Another object of the invention is to provide a simple and positive mechanism for subtracting items from the totalizer by rotating the wheels of the totalizer in the same direction as when adding items. This is accomplished by having a differentially timed mechanism for connecting the actuators with the totalizer wheels.

Another object is to provide mechanism for printing the total shown by the totalizer. The type carriers are connected positively to the differential mechanism which is normally controlled by the press-in keys, but when printing a total the totalizer wheels control the differential mechanism so that the rotation of the totalizer wheels back to their zero positions at a totalizing operation will carry the type carriers away from their zero position a corresponding number of divisions.

Another object of the invention is to provide mechanism for printing the sub-total shown by the totalizer. After the printing of the sub-total the totalizer wheels are restored to their former positions corresponding to the amount printed.

Another object of this invention is to provide a simple and positive controlling mechanism for the totalizer.

Still another object of this invention is to provide a simple and positive interlocking mechanism between the keys of the control bank and the keys of the amount banks.

With these and incidental objects in view, the invention consists in certain novel features of construction and combination of parts, the essential elements of which are set forth in appended claims and a preferred form or embodiment of which is hereinafter described with reference to the drawings which accompany and form part of this specification.

Of said drawings:

Fig. 2 is a detail view of a part of the totalizer mechanism.

Fig. 3 is a transverse section of the machine taken on the line 3—3 of Fig. 1.

Fig. 4 is a detail view of part of the differential mechanism.

Fig. 5 is a detail view of part of the differential mechanism.

Fig. 6 is a detail view of the differential driving mechanism.

Fig. 7 is a transverse section of the machine taken on the line 7—7 of Fig. 1.

Fig. 11 is a detail view of the key release cam.

Fig. 12 is a detail view of the indicator alining cam together with a part of the totalizer control mechanism.

Fig. 13 is a detail view of part of the mechanism shown in Fig. 12.

Fig. 14 is a detail view of the totalizer engaging cam and arm effective during sub-total taking operations.

Fig. 15 is a detail view of the totalizer engaging cam and arm effective in adding, subtracting, and total taking operations.

Fig. 16 is a detail view of part of the totalizer control mechanism.

Fig. 17 is a detail view of another part of the totalizer control mechanism.

Fig. 18 is a top plan view of part of the mechanism showing the totalizer controlling mechanism.

Fig. 19 is a detail view part of the totalizer engaging mechanism.

Fig. 20 is a detail view of the regular key detent plate for the control bank.

Fig. 21 is a detail view of the key detent in the control bank for controlling the totalizer.

Fig. 22 is a detail view of the key interlocking detent in the control bank for disabling the keys in the amount banks.

Fig. 23 is a detail view of the key detent in the amount banks with its interlocking connections.

Fig. 24 is a detail view of part of the mechanism shown in Fig. 23.

Fig. 25 is a detail view of the machine lock controlled by the key detent shown in Fig. 20.

Fig. 26 is an enlarged sectional view of the totalizer taken on the line 26—26 of Fig. 9.

Fig. 27 is an enlarged sectional view of the totalizer taken on the line 27—27 of Fig. 9.

Fig. 28 is an elevational view of part of the right side of the machine showing the operating device.

Fig. 29 is a detail view of the mechanism shown in Fig. 24 with the parts shown in their operated positions.

Figure 1:
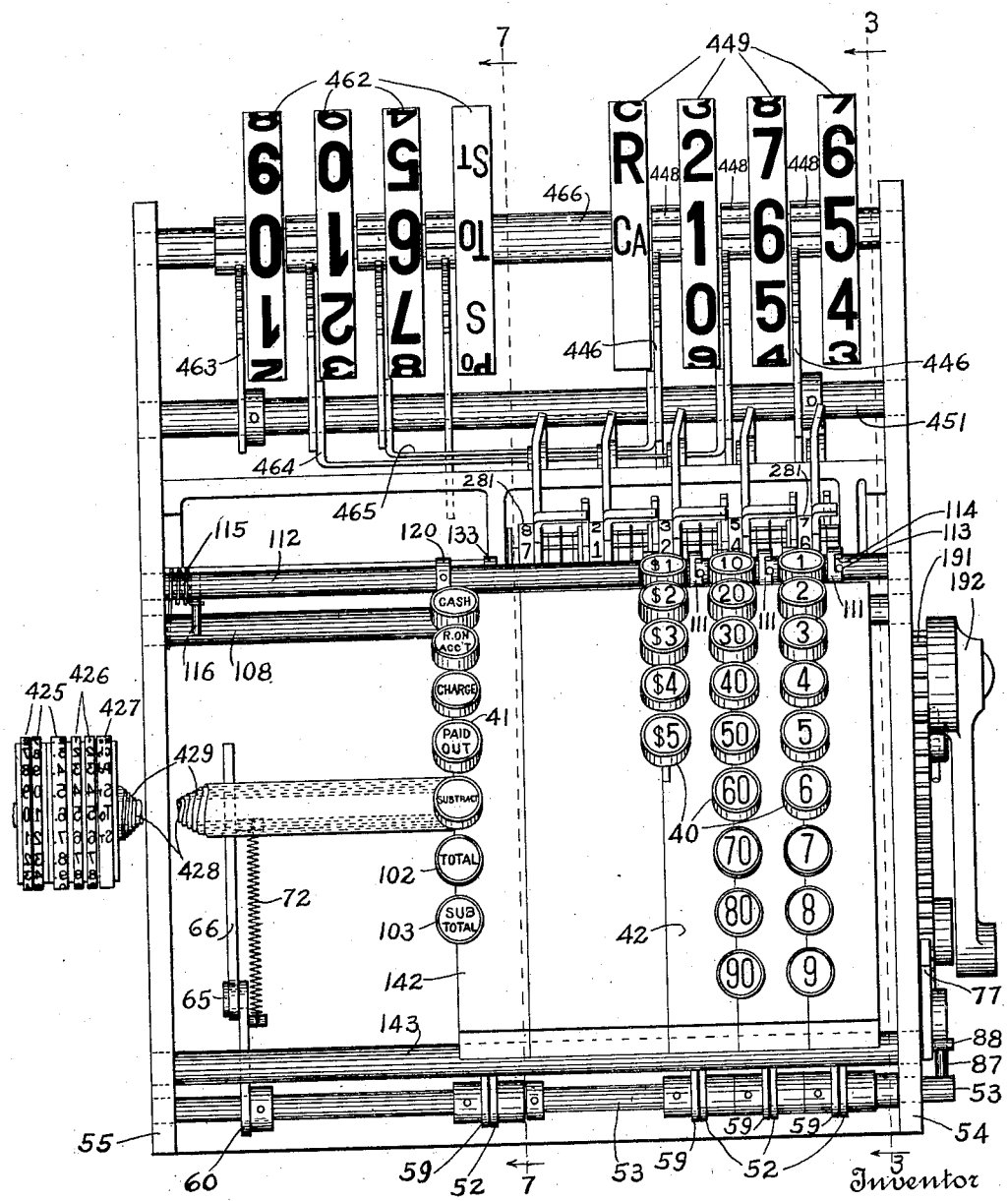
Fig. 1 is a front elevation of the machine.
Figure 8:
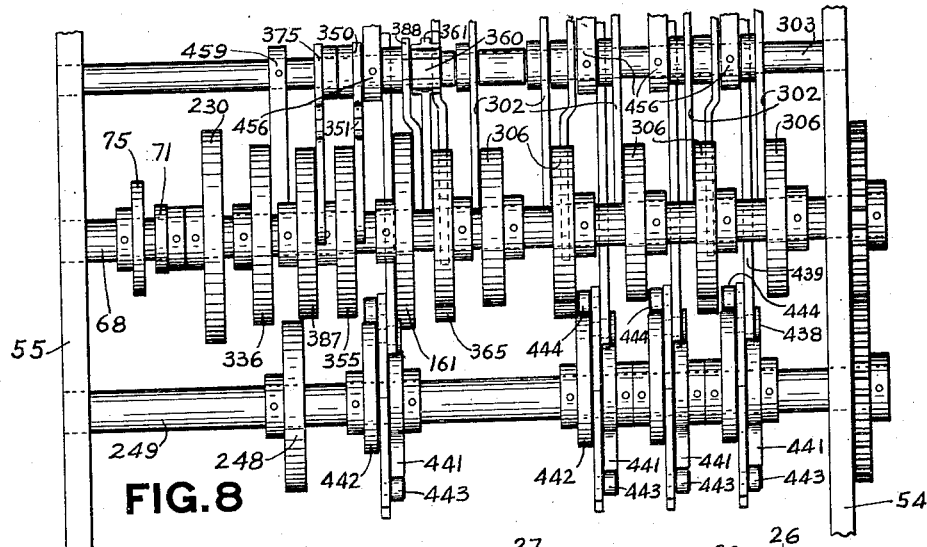
Fig. 8 is a front elevation of the driving shafts.

The cash register shown in the drawings is constructed to add item amounts on a totalizing device. As the item amounts are added on the totalizer, they are simultaneously displayed, together with the characters representing the classification of the registration, by indicators showing both at the front and the rear of the machine.

Any standard printing mechanism can be used to print the amounts. The type carriers are set by the differential mechanism of the machine normally controlled by banks of keys. This differential mechanism may be controlled by the totalizing devices for the purpose of setting the type carriers to print totals.

The differential mechanism employed in the present invention includes a plurality of pairs of differentially movable pivoted arms, the arms of each pair being movable toward each other, and the sum of the movements of the arms of each pair being constant. There is one pair of arms for each bank of keys, and where there are more numeral wheels in the totalizer than there are banks of amount keys, there is also a pair of pivoted arms for each of these wheels for total-taking purposes.

In a regular registering operation of the machine, the keys control the relative movements of the pivoted arms so that upon movement of the pivoted arms one of them may actuate, to the desired extent, a corresponding element in totalizing device.

The pivoted arms of each pair are driven in opposite directions by planetary gearing driven by an oscillating shaft operated by a cam, and are provided with formed ears which are adapted to contact the depressed keys and thereby stop the movements of these arms. The ears on the two arms are so located relative to each other that when the one ear contacts a key the corresponding ear on the other arm will not contact the key until the total movement of the two arms amounts to some predetermined and constant value. Thus, if one arm is stopped after having made one unit of movement its companion arm will not contact the key until it has moved the complement of the one unit, viz., eight units of movement.

This principle of differential mechanism permits it to carry any desired load at any desired velocity, as the cam which is employed to operate the planetary gearing may be designed to bring its shaft to a stop at the limits of its movement as gradually as desired. This mechanism, therefore, obviates all possibility of overthrow or undue strain therein, or in the devices operated thereby.

As above stated, the pivoted arms are controlled in their swinging movement toward each other by the keys. Each pivoted arm operates a totalizer actuator, there being two actuators for each bank of amount keys, one for the purpose of adding item amounts on the totalizer and the other for subtracting amounts from the totalizer. These actuators are in constant engagement with pinions freely mounted on the totalizer shaft and are coupled to the numeral wheels by pinions carried on swinging arms, there being one of these arms for each actuator. The operation of these arms is timed differently so as to obtain the various results in totalizing. The totalizer wheels will rotate in a common direction for both adding and subtracting registrations, the adding actuator being operated by the upper pivoted arm of the complementary differential mechanism and the subtracting actuator being operated by the lower arm to rotate in the same direction.

*Keyboard*

The operating mechanism of the machine is controlled by a plurality of banks of value keys 40 (Figs. 1 and 3), and a bank of control keys 41 (Figs. 1 and 7). The purpose of the value keys is to control differential mechanism for operating the totalizing devices, the type carriers and the indicators, and the object of the control keys is to control mechanism for adding amounts on the totalizer, for subtracting amounts from the totalizer, and for printing totals or sub-totals from the totalizer.

The value keys 40 are slidably mounted in key frames 42 and are depressible against springs 43 compressed between shoulders 44 on the keys and a flange 45 of the key frame. A spring is provided for each key, but only one spring is shown in the drawings.

To prevent the depression of more than one key at a time in any one bank, the keys are provided with pins 46 which cooperate with disks 47 loosely supported in a groove in the key frame and held in this groove by a key detent 48. The disks are of such size as to permit the depression of only one key at a time.

In order to retain the keys when depressed in depressed positions during the operation of the machine, the detents are slidably mounted upon studs 49 projecting laterally from the key frame 42 and are provided with a plurality of inclined slots 50 located in the path of movement of the pins 46 on the keys. Therefore, when a key is depressed the detent will move upwardly against the action of a spring 51 attached to the key detent and to a pawl 52 pivoted on a rock shaft 53, supported at its ends in the side frames 54 and 55 of the machine. The purpose of the pawls is to retain the detents and thus the keys in their moved positions, after the desired elements of the differential mechanism have been released. Normally the upper end 56 of the pawl contacts the upper side of a projection 57 on the key detent, and as the key moves the detent upwardly the projection passes above the upper end of the pawl, which being under spring tension will pass under the projection, and in this position will retain the key detent in the moved position until at the proper time during the operation of the machine the pawl will be rocked in a clockwise direction allowing the spring 51 to return the detent to its normal position, and simultaneously the key spring 43 to return the depressed key to its normal position. Each pawl is provided with a laterally projecting pin 58 for co-operating with a bifurcated arm 59 pinned to the rock shaft 53 to rock the pawl clockwise to release the key detent. This rock shaft is rocked by an arm 60 (Figs. 1 and 7) fastened thereto near the left hand side of the machine and provided with a laterally projecting stud 65 in its upper end to which one end of a pitman 66 is connected. The other end of the pitman (Figs. 7, 11 and 18) has an elongated opening 67 to guide the pitman on a shaft 68.

Carried on a stud 69 (Figs. 11 and 18) projecting from the pitman 66 is a roller 70 which cooperates with a cam 71 fast on the shaft 68 to move the pitman a sufficient distance to remove the pawl 52 from the key detent to permit the spring 51 to return the detent to its normal position. The pitman 66 is held in its normal position, as shown in Figs. 7 and 11, by a spring 72 attached at one end to the pitman and its other end to the arm 60.

As a key 40 (Fig. 3) is being depressed a block 73, (Fig. 11) fastened to the side of the pitman 66 is moved into a slot 74 in a disk 75 fastened to the shaft 68. When the key is fully depressed, the block again occupies the position shown, outside of the notch 74. It can be seen by reference to Fig. 11 that a slight movement of the pitman will prevent rotation of the shaft 68, and therefore an operation of the machine will be prevented when a key is partially depressed. This locking device also serves another purpose and that is to lock the keys 40 against manipulation during an operation of the machine until such time as the keys would be released had they been depressed before operating the machine. As the shaft 68 (Fig. 11) starts to rotate, the solid portion of the disk 75 will immediately move into the path of the block 73, in which position the arm 59 (Fig. 3) will bear against the pin 58 in the pawl 52 and prevent the projection 57 on the detent 48 from moving out of its normal position.

The machine is provided with a release lever in order that the keys which are depressed by mistake may be released without operating the machine. This lever 77 (Figs. 1 and 28) is freely mounted upon the right hand end of a shaft 78 and outside of the right side frame 54 of the machine. A pin 79 projecting from the side frame 54 cooperates with a projection 80 to limit the downward movement of the lever 77. A spring 85 normally holds the lever in its upward position with a projection 86 resting against the pin 79. The rock shaft 53, which is rocked to release the keys, extends through the right side frame 54 and is provided with an upwardly projecting pin 87 which cooperates with a pin 88 projecting laterally from the lever 77. As the lever is pressed downwardly the pin 88, which is in contact with the pin 87, will move the rock shaft in a clockwise direction causing the ends of the pawls 52 to move away from the projections on the key detents 48, thereby permitting the detents to slide back to normal position under the action of the springs 51, and also permitting the depressed keys to rise to normal positions under the action of their springs.

The key detent in each bank of keys controls a latch which normally retains the upper pivoted arm of the differential mechanism in an inoperative position until a key has been depressed. Latch 89 (Figs. 3, 23, 24 and 29) cooperates with the differential mechanism of the amount banks, while latch 90 (Figs. 7 and 20) cooperates with the special or control bank differential mechanism.

The latch 89 (shown in detail in Figs. 23, 24 and 29) is freely mounted upon a stud 91 mounted in the upper part of the key frame and normally contacts a pin 92 projecting from the key detent by a spring 93 attached to the detent and the latch. As a key is depressed and its detent moved, the pin 92 which is in contact with the side of the opening 94 in the latch 89 that is inclined to the general direction of travel of the detent, will cause the latch to swing on its pivot in a clockwise direction thereby disengaging its shoulder 95 from a formed lip 96 on the upper pivoted arm 206 of the differential mechanism. As the upper arm of the differential mechanism returns to its normal position its lip will cooperate with an inclined edge 97 of the latch and swing the latch on its pivot against the tension of its spring until the lip passes the shoulder 95 when the latch will drop into its locked or normal position and remain there until another key is depressed or until it is operated by the totalizing mechanism which will hereinafter be described.

When an amount key (Fig. 1) has been depressed, the "total" key 102 and "sub-total" key 103 are locked in their normal positions so that they can not be operated. Also, by depressing either the "total" key or the "sub-total" key the amount keys are automatically locked against operation.

This interlocking of keys of different banks is accomplished by an arm 104 extending from the detent 48 (Figs. 3 and 23) and carrying a laterally projecting pin 105 which extends into an opening 106 in an arm 107 freely mounted upon a rod 108 supported at its ends by the side frames of the machine. As the key detent 48 is moved by depressing a key 40, the arm 107 will swing in counterclockwise direction. A notch 109 in its upper edge cooperates with a projection 110 on a collar 111 mounted upon the rock shaft 112, to move the collar clockwise. Pins 113 projecting from opposite sides of the rock shaft cooperate with recesses 114 in the side edges of the collars 111 to transmit movement from the collar to the rock shaft as a key in any of the amount banks is depressed.

The connection between the rock shaft 112 and the collars 111 is such that the depressing of a key in any one amount bank will move its associated collar only and will not move the collars associated with the other amount banks. After the return to normal positions of the depressed amount keys, the shaft 112 will be returned to its normal position, as shown in the drawings, by a spring 115 which encircles the shaft (Fig. 1) near its left hand end. One end of the spring engages the rod 108, the other end being hooked around a pin 116 which projects downwardly from the shaft 112 to urge the shaft 112 in counterclockwise direction.

Fast to the rock shaft 112 is a collar 120 (Figs. 1, 7, 20, 21 and 22) having a projection 121 cooperating with a slot in an arm 122 freely mounted upon the rod 108, and as the rock shaft 112 is rocked by the depressing of an amount key the arm 122 will be lowered to a position in which a formed ear 123 thereon (Fig. 22) will be below the corner 124 of a key interlocking detent plate 125 and thus prevent such movement of this plate.

The lower two slots 126 in the key interlocking detent plate 125 (Figs. 7 and 22) are arranged at such an angle to the direction of travel of the pins 46 in the "total" and "subtotal" keys that when these keys are depressed the key plate 125 will be given an upward movement. It can thus be seen from the drawings and foregoing description that when an amount key has been depressed the "total" and "sub-total" keys are locked against operation by the arm 122.

The other keys in the "special" or "control" bank when depressed do not move the key interlocking detent plate 125 for the reason that their key pins travel in slots 127 the sides of which are parallel with the direction of travel of said pins.

As previously stated, when either the "total" or "sub-total" key is depressed all the amount keys are locked against operation. This is accomplished by an arm 128 on the key interlocking detent plate 125 (Figs. 7 and 22), which carries a pin 129 cooperating with an elongated opening in an arm 130, freely mounted upon the rod 108. The arm has a slot 131 with which a projection 132 on a collar 133 fast on a rock shaft 134 cooperates to rock said rock shaft. The ends of the rock shaft are journalled in the side frames of the machine.

Fastened at various places on the rock shaft 134 are collars 135 (Figs. 3, 23 and 24) there being one for each amount bank of keys. Each of these collars has a projection 136 which engages with a notch 137 in an arm 138. The arm 138 is freely mounted upon the rod 108 and is rocked counter-clockwise by depressing either the "total" or "subtotal" key, which brings a formed ear 140 on the arm 138 (Fig. 23) to a position below the point 141 on a corresponding key detent 48, thus locking the detent against movement, and the amount keys can not be depressed.

There are three separate key plates in the "special" or "control" bank, each performing certain functions. They are placed side by side and slidably mounted upon the studs 144 which project laterally from a key frame 142 (Fig. 7) supported by the rods 108 and 143. The first of these plates, namely the interlocking detent plate 125, having been described, reference will next be made to Fig. 20, which shows a key detent plate 145 whose functions are to retain a key 41 in a depressed position, unlatch the differential arm of the special bank, and unlock the machine for operation.

The depressing of any one of the keys 41 in this bank will move the detent plate 145 a uniform distance. The inclination of the slots 146 which governs the travel of this plate will also retain the keys in their depressed positions through the cooperation of the pawl 52 (Fig. 7) which engages the projection 57 on the detent plate 145. The upper end of the detent plate has a clearance notch 147 for the arm 122 so that the arm 122, when lowered, will not engage with this detent plate to lock it against movement.

The latch 90 (Fig. 20) for the differential arm is pivoted on a stud 148 projecting from the key frame and is raised by a pin 149 on the key detent plate 145 projecting into an opening 150 formed in the latch 90 and inclined to the general direction of travel of the key detent. A spring 155 returns the latch to its normal position and retains it in this position until a key is depressed.

To unlock the machine for operation, the pin 149 in the detent plate 145 (Figs. 7, 20 and 25) extends into an elongated opening 156 in a lever 157 pivoted upon a shaft 158. The opening extends in a direction inclined to the general direction of travel of the detent plate. The lower end 159 of the lever normally engages with a shoulder 160 formed in a cam 161 which turns clockwise at each operation of the machine. As the detent plate is moved upon depressing a key the pin 149 will rock the lever clockwise and remove the end 159 from the shoulder 160, thereby permitting an operation of the machine.

The third key plate 162 (Fig. 21) controls the totalizer in cooperation with the keys in the "special" or "control" bank. The first and second key pin slots 163 are parallel with the direction of travel of the key pins, so that when either the first or "cash" key, or the second or "received on account" key, is depressed, the key plate will remain in its normal position. In this position the totalizer mechanism will accumulate items represented by the amount keys when depressed.

The third key pin slot 164 is slightly inclined to the direction of travel of its cooperating key pin so that when the third or "charge" key is depressed the plate 162 will move upwardly one division of movement. The plate has a rearwardly extending arm 165 carrying a pin 166 projecting into a slot 167 formed in an arm 168 fast to one end of a sleeve 170 (Fig. 18) freely mounted on a stud 169 projecting from the left side frame of the machine. Fast to the other end of the sleeve 170 is a segment 171 meshing with a mutilated gear 172 fast to a differential cam 173 freely mounted upon the shaft 158 between collars 174 and 175 pinned to the shaft. It can thus be seen that the movement of the plate 162 will rotate the differential cam 173. This cam is divided into five sections, any one of which may cooperate with the totalizing mechanism which will hereinafter be described.

The fourth key pin slot 177 (Fig. 21) is parallel with the slot 164, so that when the fourth or "paid out" key is depressed its associated key pin will move the plate 162 the same distance as when the third key is depressed. Therefore, the same section of the differential cam cooperates with the totalizing mechanism for both the third and fourth keys.

The fifth key pin slot 181 is formed at a greater inclination than the slots 164 and 177, so that when the fifth or "subtract" key is depressed its associated key pin will move the plate 162 two divisions of movement to rotate the differential cam to bring a different section of the cam into cooperation with the totalizing mechanism.

The sixth key pin slot 182 extends at such an angle to the direction of travel of its associated key pin that the plate 162 will be moved three divisions of movement when the sixth or "total" key is depressed, adjusting the cam to another position for cooperation with the totalizing mechanism.

The seventh or last key pin slot 183 is of still greater inclination than the preceding slots and causes the plate 162 to move four divisions, or its greatest movement, thus bringing the fifth or last section of the differential cam into cooperation with the totalizing mechanism.

As with all the other key plates, this plate 162 is retained in its normal position by a spring 184. The upper end of the key plate is cut away to form a shoulder 185 for cooperation with the ear 123 to prevent depressing of the "total" or "sub-total" key when one of the amount keys is in a depressed position, and to allow the depressing of any one of the first five keys in the "special" or "control" bank in connection with any of the amount keys. The arm 122 (Fig. 21) when lowered by the rocking of the rock shaft 112 upon depression of any amount key, will cause the ear 123 to come into contact with the shoulder 185 only when either of the last two keys, which are the "total" and "sub-total" keys, are partially depressed, which will prevent a full depression of these keys and the machine cannot be unlocked for operation. On the other hand should either of these keys 102 or 103 be depressed previous to depressing the amount key the key plate would be moved to bring its edge 186 under the ear 123. In this position of the plate the arm 122 can not be rocked and, consequently, the amount keys can not be depressed.

*Driving mechanism*

In Fig. 28 are shown two main drive shafts 68 and 249 geared to a pinion 191, fast to a crank 192. An intermediate gear 193 pivoted on a stud 194 carried by the frame 54 serves to transmit motion from the pinion 191 to a gear 195 fast to the shaft 68 and a gear 196 fast to the shaft 249. Each operation of the machine requires one rotation of the shafts 68 and 249. Consequently from the gear ratio shown in Fig. 28 it is necessary to turn the crank handle twice to effect a single rotation of the drive shafts.

At the end of an operation the driving mechanism is stopped at the proper position by a pawl 197 which is brought into engagement with a shouldered stop plate 198 riveted to the gear 195. This pawl normally prevents forward rotation of the driving mechanism. The driving mechanism may be released by moving the crank backwards slightly, thus causing the shouldered stop plate to move upwardly slightly thereby releasing the pawl, which then moves backwardly urged by its spring 199. Then the crank is rotated in a forward or clockwise direction, at the end of which time a pin 200 on the gear 195 strikes a forwardly extending arm 201 of the pawl, rocking the pawl back into stopping position.

Differential mechanism

The differential mechanism includes a plurality of pairs of complementary pivoted arms 205 and 206 (Figs. 3, 4, 5, 7 and 9) connected together by segments 207, 208 and 209 and gears 210 and 211. Said arm 205 is loosely mounted on a rod 213, and the segments 207, 208, 209 and an arm 212, are loosely mounted on a shaft 214. The rod 213 and shaft 214 are supported in bearings in the side frames 54 and 55 of the machine. The gears 210 and 211 are loosely mounted on rods 215 and 216 supported at their ends by arms 217 and 218 pinned to the shaft 214, (Figs. 6 and 9) which has an oscillating motion, first in counter-clockwise direction and then clockwise at each operation of the machine.

Loosely mounted on the shaft 214 and cooperating with the arm 218 is a lever 219. This lever is loosely mounted on the shaft so as to form means for adjusting the normal location of the gears 210 and 211 in relation to their cooperating segments. A bolt 220 (Figs. 6 and 9) passing through an elongated opening in the arm 218 connects said arm and the lever to permit adjustment between the two. The adjustment is made by first loosening a nut 221 and then turning a screw 222 in either direction as the requirements may be. The screw has threads of different pitch to permit a very close adjustment of the parts. The lower portion 223 of the screw engaging the bolt 220 is of a finer pitch than the upper portion which is threaded in the arm 218.

The shaft 214 is oscillated by a cam 230 fast on the driving shaft 68 (Figs. 6, 7, 8 and 18). Cooperating with the cam 230 to give motion to the shaft 214 is a pitman 231 which carries a roller 232 loosely mounted on a laterally projecting stud 233, and working in a formed groove 234. The forward end of the pitman is loosely mounted on a bushing 235 (Fig. 9) surrounding a bolt 236 mounted in the upper end of the lever 219. The bolt passes through an elongated opening 237 in the lever and is held in place by an adjusting screw 238 and a nut 239 which locks the bolt in place after being adjusted. The adjusting screw 238 has two differently pitched threads to allow for close adjustment.

Referring to Figs. 3, 4, 5, 6, 7 and 24, a description of the operation of the differential mechanism will be given. In an operation where none of the keys 40 in a bank are depressed the upper complementary pivoted arm 206 corresponding to said bank will be retained in its normal position by the latch 89, and as the shaft 214 and arms 217 and 218 are rocked in a counter-clockwise direction by the cam 230, the rods 215 and 216 are moved towards the rear of the machine and the gear 210 being in mesh with the segment 209, which is a part of the arm 206, will be rotated counter-clockwise, causing the gear 211 to rotate in the opposite or clockwise direction, which will move the segments 208 and 207 in counter-clockwise direction. As the teeth of the segment 207 are in mesh with the teeth 240 of the lower complementary pivoted arm 205 said arm will swing on its pivot 213 a distance equal to nine units of movement. After being maintained in that position for a short period of time by the cam 230, as shown in Fig. 6, the arm 205 will be returned positively to its normal position by the same gear mechanism. This operation has not affected the arm 212 for the reason that no key being depressed in that particular bank it did not require moving either the type wheel or the indicator, both of these members remaining in their zero positions.

In an operation where the upper or one unit key in any bank is depressed, which causes the raising of the latch 89 (Fig. 3), the upper complementary pivoted arm 206 will, at the operation of the machine, swing downwardly or counter-clockwise until the lip 96 contacts the end 241 on the depressed key, which is one division of movement. As this pivoted arm is brought to a stop by coming in contact with the key, the segment 209 becomes stationary and, during the remainder of the movement of the shaft 214 and arms 217 and 218 in the counter-clockwise direction and of the rods 215 and 216 towards the rear of the machine, the gears 210 and 211 will move the segments 208 and 207 counter-clockwise, swinging the lower pivoted arm 205 upwardly eight divisions of movement, at which point an ear 242 formed thereon will contact the end 241 of the depressed key.

As the upper pivoted arm 206 is brought downwardly, its ear 96 is brought into contact with the arm 212, to move said arm downwardly with the arm 206, thereby moving the printing wheel from the zero position to this one unit position, and also causing the indicator to change from the zero position to the one unit position as is hereinafter described. The upper end 243 of arm 212 is of the same width as the end of the key so that when the pivoted arms swing toward each other to engage a depressed key they will place the arm 212 in lateral alinement with said key. The arm 212 will not return to the zero or normal position near the end of the operation, as do the pivoted arms, but will remain in a position corresponding to the key that is depressed at each operation. The arm may be moved from the last position to the new position by either one of the pivoted arms 205 or 206, depending upon its relative position to the next depressed key. Referring to Fig. 3, when the last or nine unit key is depressed the ear 242 on the lower pivoted arm 205 will engage the key and prevent this pivoted arm from moving and this will cause the upper pivoted arm to swing downwardly, together with the arm 212 until the ear 96 contacts the depressed key, after which the upper pivoted arm 296 will return to its normal position, leaving the arm 212 in lateral alinement with the last key. If at the next operation the fifth or five unit key be depressed the lower pivoted arm will swing upwardly, together with the arm 212, until the ear 242 comes in contact with the depressed key, the upper pivoted arm traveling downwardly the complement of the full movement, or until the ear 96 contacts the depressed key.

Figure 10:
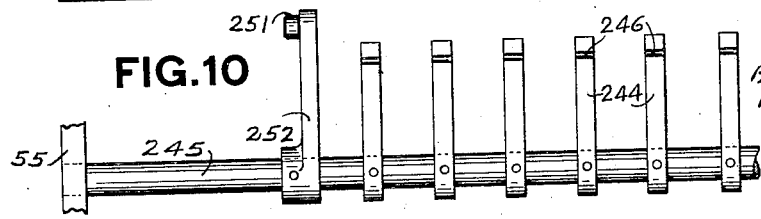
Fig. 10 is a front elevation of the type wheel segment locking pawl line.

The arm 212 is normally locked in its different positions by an arm 244 pinned to a rock shaft 245 supported by the side frames of the machine (Figs. 3, 7 and 10). Its upper end 246 is formed to cooperate with the notches 247 formed in a semicircular part of the arm 212, there being a notch for each position of the arm. There is one arm 244 for each of the differential mechanisms.

The engaging and disengaging of the arms 244 with and from the arms 212 is effected by a cam 248 (Figs. 3 and 8) fast to a drive shaft 249 which is rotated in a counter-clockwise direction at each operation of the machine. Projecting into a cam groove 250 in the cam is a roller 251 loosely mounted on a stud projecting laterally from the upper part of an arm 252 fast on the rock shaft 245. The cam groove is so formed as to disengage the arms 244 from the arms 212 at the beginning of the operation of the machine and retain them disengaged until after the complementary pivoted arms 205 and 206 have been moved to a position corresponding to the key depressed. The cam groove will return the locking arms to their normal positions in engagement with the arms 212.

On another part of the arm 212 (Figs. 3 and 7) are a number of teeth 260 which engage with teeth of a partial gear 261 for operating a type wheel of the printing mechanism which will hereinafter be described.

Projecting laterally from the arm 212 is a pin 262 (Figs. 3 and 7) which engages the indicator mechanism to change the indicators from one position to another corresponding to the key depressed. The operation of the indicator mechanism will hereinafter be described.

Attached to and constituting a part of the differential mechanism are two segments which operate the actuators for the totalizer. One of these segments 263 (Figs. 3 and 4) is fast to the segments 207 and 208 and is controlled by the lower pivoted arm 205 and operates the subtracting actuator. The other segment 264 (Fig. 5) is fast to the upper pivoted arm 206 and operates the adding actuator.

*Totalizing mechanism*

Items represented by the amount keys are added to and taken from the totalizer by sets of actuating segments operated by the differential mechanism.

For each bank of item or amount keys there is an actuator for adding items on the totalizer, and for each numeral wheel in the totalizer there is an actuator for subtracting items from the totalizer.

Figure 9:
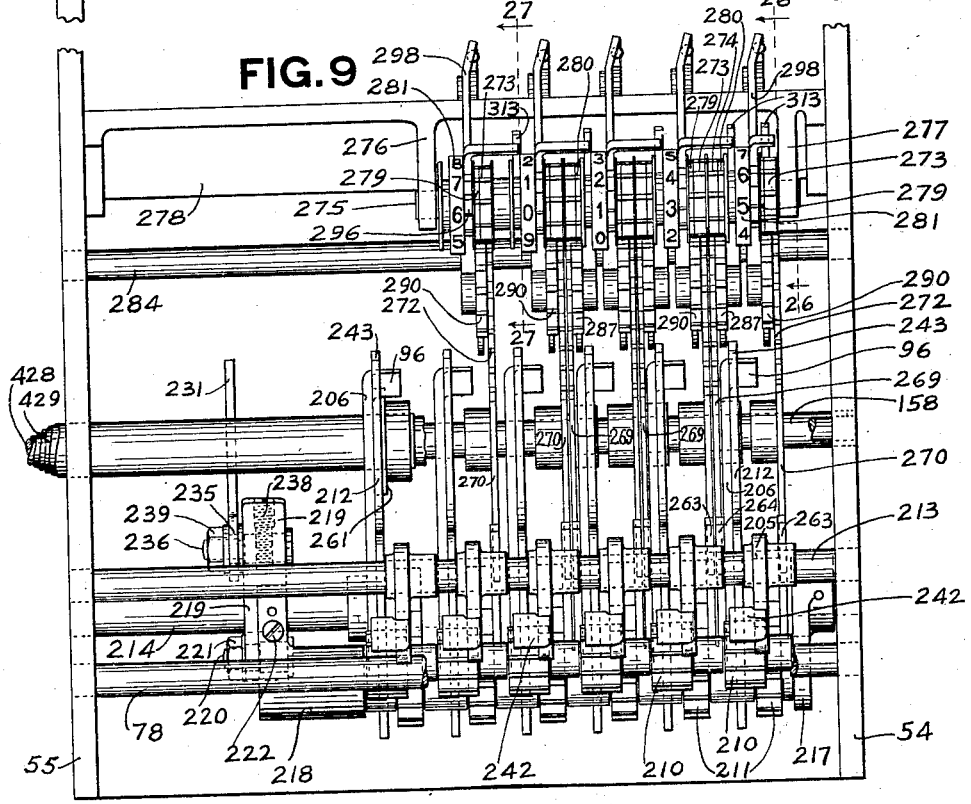
Fig. 9 is a front elevation of the differential mechanism and totalizer.

The subtracting actuator 270, shown in Figs. 3 and 9, is loosely mounted on the rod 158 and is provided with teeth 271 in mesh with the segment 263, previously described.

The adding actuator 269 (Fig. 9) is of the same form as the subtracting actuator 270 shown in Fig. 3, is loosely mounted on the rod 158, and is provided with teeth in its lower portion engaging teeth in the segment 264 (Fig. 5).

All of the subtracting and adding actuators 270 and 269 have teeth 272 (Figs. 3 and 9) cut in their upper forward edge, which teeth are at all times engaged with idler gears 273 and 274, respectively, these gears being loosely mounted on a rod 275 (Figs. 3, 9, 26 and 27) supported at its ends by lugs 276 and 277 projecting forwardly from a bar 278 fastened at its ends to the side frames of the machine.

Each of the idler gears 273 and 274 has a companion gear 279 and 280 fast to a numeral wheel 281. The gear 279 is fastened to the right hand side of the numeral wheel to cooperate with a coupling pinion 290 when subtracting items from the numeral wheel. The gear 280 is fastened to the left hand side of the numeral wheel to cooperate with a coupling pinion 287 when adding items to the numeral wheel.

The totalizer actuators 270 and 269 (Fig. 3) are constantly engaged with the idler gears 273 and 274 respectively (Fig. 9), and in order that the movement of the complementary differential arms 205 and 206 may effect rotation of the numeral wheels 281 it is necessary to couple the idler gears 273 and 274 to their companion gears 279 and 280 fastened to the numeral wheels. Provided for this purpose are the above mentioned coupling pinions 290 and 287 (Figs. 3, 9, 26 and 27) which are loosely mounted on studs 282 projecting laterally from arms 283 and 288 pivoted on a rod 284, the ends of which are supported by the side frames of the machine. The pinions 290 and 287 when not engaged with the gears 273 and 274 are held against rotation by arms 285 (Figs. 26 and 27) pivoted on the rod 284. The forward ends 289 of these arms are formed to engage between teeth on the pinions. The rear end of each arm has two projections 291 which engage a yoke 286 (Figs. 3, 7, 18, 19 and 26) to oscillate the arms 285 with the yoked member at each operation of the machine and disengage the ends 289 from the pinions 290 and 287 after the pinions are in mesh with the idler gears 273 and 274 and companion gears 279 and 280. After the totalizer wheels 281 have been moved by the actuators 270 or 269 the ends 289 are again brought into engagement with the pinions 290 and 287 before they are disengaged from the gears 273 and 274. The pinions 290 and 287, therefore, are held in locked positions during the engaging and disengaging operations and also in their normal positions as shown on the drawings. The mechanism for oscillating the yoke and also the coupling pinion arms 283 and 288 will hereinafter be described.

Referring to Figs. 3 and 9 when the coupling pinions 287 are in mesh with the totalizer gears 274 and 280 for entering an amount in the totalizer, the adding actuator 269 of each bank in which a key has been depressed will rotate the numeral wheel 281 in counterclockwise direction a number of divisions equal to the value of the key depressed. After the amount has been entered the coupling pinions will be disengaged from the totalizer gears and the actuator will be returned to its normal position.

Fast to the right hand side of each numeral wheel 281 is a ratchet wheel 296 (Figs. 9 and 26) which, in cooperation with a pawl 297, prevents a retrograde motion of the totalizer wheel and retains the wheel in the position in which it is placed by the actuator. The ratchet also cooperates with a transfer pawl 298 to rotate a totalizer wheel one division at each complete rotation of the totalizer wheel of the next lower order.

The pawl 297 (Figs. 26 and 27) is loosely mounted on a rod 299 and is held in contact with the ratchet wheel 296 by a spring 300 compressed between the rear end of the pawl and the arm 278.

The transfer pawl 298 (Figs. 3, 9 and 26) is pivoted on a stud 301 mounted near the upper end of a lever 302 which is pivoted on a shaft 303 supported at its ends in the side frames of the machine. The lower end of each lever 302 (Fig 3) carries a roller 304 freely mounted on a stud and cooperating with a cam groove 305 in a disk 306 fast to the shaft 68. The grooves in the disks are of different forms so as to operate the levers 302 in succession, beginning with the first lever on the right, to transfer from the totalizer wheel of the lowest order to that of the next higher order and across the entire totalizer, all of which is well known in the art. The grooves are also formed to hold the transfer pawls intermediate their forward and backward positions when the machine is at rest. A spring 307 (Fig. 26) compressed between a projection 308 extending to the rear of each lever 302 and the rear end 309 of the transfer pawl, will cause the forward end 310 of the transfer pawl to engage the ratchet wheel, or an ear 311 formed thereon to rest on the shoulder 312 formed in the upper part of a trip pawl 313. The trip pawl 313 shown in Fig. 26 is of a special type and is used only in connection with the first wheel in subtracting and totalizing operations which will hereinafter be described.

A trip pawl 313 such as is shown in Fig. 27 is associated with each of the totalizer wheels and is used in both adding and subtracting items. A spring 320 compressed between the bar 278 and a trip pawl causes a curved arm 321 of the pawl to normally contact said bar. At the beginning of the operation of the machine the ear 311 on the transfer pawl will engage the shoulder on the trip pawl and cause the same to move slightly in clockwise direction. In this position, as the numeral wheel 281 of the first unit is moved from the "9" position to the "10" or zero position, a pin 322 projecting laterally from the side of the numeral wheel 281 will contact the point 323 formed on the trip pawl and cause the pawl to move farther in a clockwise direction allowing the pin to pass above the point. As the trip pawl is moved by the pin its shoulder 312 will travel away from the ear on the transfer pawl a sufficient distance to allow the transfer pawl 298 to swing on its pivot under the action of its spring 307 to place its forward end behind a ratchet tooth 324 of the second unit, so that as the transfer pawl is moved forwardly the numeral wheel of the second unit will rotate one division of movement.

This same method is employed in all other wheels in transferring from wheels of lower to wheels of higher order, all of which is well known in the art.

Referring to Fig. 26, the trip pawl 313 which is of special type and used only in subtracting and totalizing operations, is not moved on its pivot by a pin in the numeral wheel as the other trip pawls are, but is operated by a pin 325 projecting laterally from the arm 283. A downwardly and forwardly extending projection 326 on the trip pawl normally rests on the pin 325. As the arm 323 swings on its pivot, during subtracting and totalizing operations, to move the pinion 290 into engagement with the gear 273 the pin will cause the trip pawl to swing in a clockwise direction a distance sufficient to remove its shoulder 312 from the ear on the transfer pawl 298 and allow the same to drop to a position behind a ratchet tooth and move the unit totalizer wheel one division during the forward movement of the transfer pawl.

In a subtracting operation the keys depressed correspond to the amount to be subtracted, and in the operation of the machine the set of pinions 290 engage the totalizer gears 273 and 279 to add in each totalizer wheel the complement (of 9) of the key depressed in that bank. Therefore, it is necessary to move the unit wheel an additional space or division to give the correct result, which is done by the unit transfer pawl 298 in a manner previously described.

The mechanism for selecting and operating the totalizer coupling pinion arms 283 and 288 (Figs. 9, 18, 19, 26 and 27) is controlled by the key detent plate 162 (Fig. 21), previously described. The depressing of the different keys in the control bank will rotate the differential cam 173 (Figs. 7, 12, 13 and 18) to bring different divisions of the cam into a position to cooperate with a lever 330 which is loosely mounted on a shaft 331 supported at its ends by the side frames of the machine. A clip 332 fast to this lever and extending into a groove 333 formed in the shaft permits the lever to swing independently of the shaft and to carry the shaft with it as it is moved laterally.

A spring 334 (Fig. 7) attached to the forward end of the lever 330 holds the lever in its normal position with its rear end 335 in contact with the edge of a disk 336 fast to the drive shaft 68. The edge of the disk is so formed as to swing the lever counter-clockwise at the beginning of the operation of the machine, causing its forward end to cooperate with the differential cam 173 to shift the shaft 331 to the positions represented by the different sections of the differential cam.

The first section 338 of the differential cam (Figs. 12 and 13) is normally in position to cooperate with the lever 330, and remains in such position when either the "cash" or the "received-on-account" key is depressed. In this position when the lever moves counter-clockwise its end 337 will enter the angular notch in the section 338 of the differential cam and position the shaft 331 horizontally.

A sleeve 339 (Figs. 3, 18 and 19) is fastened to the shaft 331 by a pin 340 and is provided with two sets of upwardly projecting lugs 341 and 342 which cooperate with the openings 343 in the pinion arms 283 and 288 (Figs. 3, 18, 19, 26 and 27) to operate the adding or subtracting pinion arms as the case may be.

Fig. 19 shows the lugs 342 engaged with adding pinion arms 288. This corresponds to the normal position of the selecting mechanism shown in Fig. 21 and the position for adding items to the totalizer.

To raise and lower the pinion arms 283 and 288 the shaft 331 is rocked first clockwise and then counter-clockwise by a bifurcated arm 344 pinned to the shaft 331 (Figs. 3 and 18) and moved laterally by the differential cam 173. When either the "cash" or "received-on-account" key is depressed this bifurcated arm (Fig. 18) will cooperate with an arm 350 (Figs. 3, 8, 15 and 18) to oscillate the sleeve 339 (Fig. 19) and move the gears 287 into mesh with the totalizer gears 274 and 280 (Fig. 9). This arm 350 is loosely mounted on the shaft 303 and has a notch 351 in which an oval shaped end 352 of the bifurcated arm is adapted to project. The lower end of the arm 350 has a roller 353 which cooperates with a groove 354 formed in the side of a disk 355 fast to the driving shaft 68. This mechanism operates to move the coupling gears 287 into mesh with the totalizer gears 274 and 280 during adding, subtracting and totalizing operations of the machine.

Referring to Fig. 19, the sleeve 339 is positioned to cooperate with the adding coupling pinion arms 288 while the subtracting coupling pinion arms 283 are in alinement with openings 356 in the sleeve. When either set of arms (Figs. 18 and 19) is engaged with the sleeve the other set, through its slots 343 (Figs. 19 and 26), will engage with formed ears 357 on the yoke 286 to be retained in disengaged position while the gears on the other set are performing their function.

The yoke 286 is moved laterally with the sleeve 339 by means of a bifurcated arm 358 (Figs. 7 and 18) which engages the shaft 331 between two collars 359 pinned thereto. The yoke is given two oscillating motions at each operation of the machine. In the three positions which the sleeve and yoke assume when any one of the first six keys 41 (Fig. 1) is depressed, the arm 358 (Figs. 7 and 18) will cooperate with a slot 360 in a lever 361 (Figs. 7, 8, 16 and 18). This lever is loosely mounted on the shaft 303 and near its lower end carries a laterally projecting stud 362 on which is loosely mounted a roller 363 cooperating with a cam groove 364 formed in the side of a disk 365 which is fast to the drive shaft 68.

In depressing either the "charge" or "paid out" keys the second section 371 (Figs. 12 and 21) of the differential cam will be positioned to cooperate with the laterally shifting lever 330 and cause the shaft 331 to shift to the right one space which will place the bifurcated arm 344 with its open space 372 in line with the lever 350, in which position the shaft 331 will not oscillate during the operation of the machine, and consequently the pinion arms 283 and 288 will not be operated by the sleeve 339 as in the previous operations, but they will be rocked by the yoke 286 at a time shown by the cam in Fig. 16. Therefore, no items will be added to or subtracted from the totalizer during such operation.

The shifting of the sleeve 339 to the right (Fig. 19) will disengage the lugs 342 of the sleeve from the adding pinion arms 288 and engage said lugs with the subtracting pinion arms 283. At the same time, as the yoke is moved it carries its ears 357 out of engagement with the subtracting pinion arms and its ears 379 into cooperative relation with the adding pinion arms.

In depressing the fifth key, which is the subtracting key, the third section 373 (Figs. 12, 18 and 21) of the differential cam is positioned to cooperate with the shifting lever 330 and the shaft 331 will be moved to the left one space from the normal position. In this shifted position the oval end 352 of the bifurcated arm 344 will still be engaged with the lever 350 to oscillate the shaft 331 in the same manner as when the first two keys are depressed.

The lateral movement of the shaft 331 to the left one space will cause the sleeve 339 (Fig. 19) to disengage from the adding pinion arms 288 and engage with the subtracting pinion arms 283. The ears 357 on the yoke 286 will be moved into engagement with the adding pinion arms as the sleeve is disengaged therefrom.

The sixth or "total" key, when depressed, will cause the fourth section 385 of the differential cam to be placed in cooperation with the lever 330. This section of the differential cam being of the same formation as the third section, the mechanism effected by this differential cam will maintain the same lateral position as when the fifth key was depressed.

The seventh or "sub-total" key in the control bank when depressed, will place the fifth or last section 386 (Figs. 12 and 18) of the differential cam into cooperating position with the lever 330, and as the machine is operated the shaft 331 will be moved laterally to the left two spaces from normal position, placing the oval shaped end 373 of the bifurcated arm 344 (Fig. 18) in engagement with a notch 374 (Fig. 14) in a lever 375. This lever is pivotally mounted on the shaft 303 and carries a stud 376 upon which is loosely mounted a roller 377 entered in a groove 378 formed in the side of a disk 387 fast to the driving shaft 68. The groove 378 is shaped to hold the totalizer coupling pinions engaged until the amount taken off the totalizer is again restored.

The sleeve 339 (Fig. 19), when moved two spaces to the left, will be in a position where the subtracting pinion arms 283 will be engaged by the lugs 341 and the adding pinion arms 288 will be in line with the open spaces 356 and in engagement with the formed ears 357 on the yoke 286.

The yoke 286 (Fig. 18) will have been moved to the left two spaces, which will remove the arm 358 from engagement with the lever 361 and into engagement with a lever 388 which is loosely mounted on the rod 303. The arm 358, cooperates with a slot 389 formed in the upper part of the lever 388 (Fig. 17). The lower part of the lever carries a roller 390 freely mounted on a stud 391 projecting laterally therefrom. This roller cooperates with a groove 392 formed in the side of the disk 161. The groove 392 is so formed as to oscillate the yoked member at the beginning and also at the end of the operation of the machine to disengage the locking arms 285 (Fig. 26) from and engage them with the gears 290.

In an operation controlled by the sub-total key 103 (Fig. 1) the type printing wheels are positioned for printing the amount accumulated on the totalizer by returning the totalizer wheels to the "nine" "9" position. After the printing takes place the totalizer wheels are again restored to their former positions.

Referring to Figs. 26 and 27, the totalizer wheels rotate counter-clockwise in adding and subtracting operations, and in a sub-total operation the totalizer wheels are first rotated in counter-clockwise direction and then in clockwise direction to restore them to their former positions.

To permit rotation of the totalizer wheels in a clockwise direction it is necessary to disengage the retaining pawls 297 and the transfer pawls 298 from the ratchet wheels 296.

Each of the subtracting coupling pinion arms 283 has an upwardly extending projection 395 which contacts the edge 396 of a yoke 397 (Figs. 2, 26 and 27). The yokes 397 are loosely mounted on the rod 299 and are held in contact with the projections 395 by springs 398. The raising of the pinion arms 283 will cause the yokes to swing counter-clockwise a sufficient distance to place a pin 399, projecting laterally from each yoke, in contact with the lower edge 400 of the rear end of the retaining pawl 297. In this position a flange 401 formed on the rear of the yoke will have been elevated to a position where an angle edge 402, formed on the top of the lever 403, will, as the lever swings forwardly contact the underside of the flange and cause a further movement of the yoke 397. With the pin 399 in contact with the retaining pawl while the yoke is being raised by the lever 403, the retaining pawl will swing on its pivot in counter-clockwise direction, lowering the forward end 404 out of engagement with the ratchet wheel 296 and further compressing the spring 300 which normally keeps the pawl in engagement with the ratchet wheel. A pin 405 guided in a hole of the bar 278 rests upon the rear end of the retaining pawl and as the retaining pawl is rocked out of engagement with the ratchet wheel the pin will move upwardly into contact with the transfer pawl 298 and swing it clockwise, raising its forward end out of engagement with the ratchet wheel.

The lever 403 is pivoted on the shaft 303 (Fig. 16). Its lower end 406 is formed to cooperate with the periphery of the disk 365 to rock the lever 403 at the proper time to disengage the transfer pawl and retaining pawl from the totalizer ratchet wheel, allowing a retrograde motion of the totalizer wheel during a sub-total operation. The lever is held in contact with the disk by a spring 398 attached to the yoke 397 and to the lever.

In a total or sub-total operation the item or amount keys are not depressed, consequently the upper pivoted complementary arm 206 is not unlatched by the key detent plate 48 (Figs. 23 and 24). It is necessary, however, for both of the arms 205 and 206 to move for a total or sub-total operation so that the type printing wheels may be adjusted to positions corresponding to the amounts on the totalizer wheels.

Referring to Figs. 22, 23 and 24, the movement of the interlocking detent plate 125 by the total or sub-total key locks the item or amount keys against manipulation by rocking the shaft 134 which swings the arms 138 in counter-clockwise direction to place the ears 140 in the path of the detent plates 48.

The arm 138 has connected thereto an arm 410 which moves into a position directly over the lower end 411 of a lever 412 pivoted on a stud 413 mounted in the upper end of the latch 89.

As the upper arm 206 is not unlatched at the beginning of the operation, the lower arm 205 will move and with it the actuator 270, which will cause the totalizer wheel to rotate to the "9" position where it will be stopped and the upper arm 206 unlatched to move the complement of the total movement.

Each numeral wheel 281 (Fig. 24) of the totalizer has fastened to it a disk 414 which is in the plane of the lever 412. This disk 414 has a projection 415 which, as the numeral wheel rotates in a counter-clockwise direction, is brought into contact with the end 416 of the lever 412 at the time the numeral wheel reaches its "9" position.

The lower end 411 of the lever 412 (Fig. 29) will be in contact with the arm 410 and cause the latch 89 and the lever 412 to move substantially in unison and unlatch the upper arm 206. The latch is arrested by the pin 92 in the key detent plate to stop the totalizer wheels at their "9" positions.

The lever 412 has a laterally projecting pin 417 which moves in a slot in the latch 89 to control the swinging movement of the lever 412. Attached to the pin 417 is a spring 418 which normally holds the pin in the bottom of the slot.

Should the numeral wheel 281 (Fig. 29) be in the nine position at the time of depressing either the "total" or "sub-total" key the latch 89 will be moved in a clockwise direction on its pivot by the arm 410 striking the end 411 of the lever 412 and unlatch the pivoted arm 206.

*Printing mechanism*

Any standard printing mechanism such as shown in Letters Patent No. 1,097,703, granted to T. Carroll, May 26, 1914, can be applied to this machine; therefore only the type wheels and their actuating means are shown in the drawings.

The object of the printing mechanism is to print upon record material the amount of transactions, totals and sub-totals, and a character representing the control key to which the transaction relates.

Referring to Fig. 1, the first three type wheels 425 from the left are associated with the three amount banks of keys when registering items, and when totalizing they print the amounts on the first three totalizer wheels 281 from the right. The fourth and fifth type wheels 426 are used only when totalizing and print the amounts on the fourth and fifth totalizer wheels. The sixth or character type wheels 427 is associated with the control bank of keys. These type wheels are mounted upon the left hand end of a shaft 428 and telescopic tubes 429 which are supported in the side frames of the machine. Mounted upon the right hand end of the shaft 428 and telescopic sleeves 429 are partial gears 261 (Figs. 3, 7 and 9) which mesh with the teeth 260 formed in the arms 212. As the arms 212 are moved to the different positions by the complementary arms 205 and 206 the type wheels will rotate a corresponding distance bringing into printing positions the characters to be printed.

*Indicator mechanism*

The differential movement of the arms 212 by the complementary pivoted arms will, in addition to positioning the type carriers, control the setting of the indicators in the following manner:

Each of the pins 262 (Figs. 3 and 7) projecting from the arms 212 extends into a curved slot 435 formed in the forward end of a link 436. The link has mounted in its rear end 437 a stud 438 upon which is pivoted the lower end of a vertical bar 439. The link has a slot 440 which is concentric with the pivotal point 438 and which cooperates with the driving shaft 249 to guide the link in its operation.

Fast to the shaft 249 are sets of cams 441 and 442 which, during the operation of the machine, will cause the links 436 to swing on their pins 262 as pivots to adjust the indicators. These cams 441 and 442 (Figs. 3, 7 and 8) are placed on opposite sides of each link 436 and cooperate with rollers 443 and 444 loosely mounted on studs projecting laterally from the links. The cams are formed to allow the links 436 to swing on their rear pivots 438 at the time the arms 212 are being positioned by the complementary arms. After each arm 212 is properly positioned and locked by its aligner arm 244 the cams 441 and 442 will engage the rollers and swing the links 436 on their forward pivots, raising and lowering the rear ends of the links according to the positions of the forward pivots and thereby adjusting the indicators.

The vertical bar 439 has its upper end pivoted on a stud 445 mounted in the segment 446 which has teeth 447 in its upper edge in mesh with the gear 448 fast to an indicator wheel 449 freely mounted on a rod 450.

The segment 446, which cooperates with the first indicator on the right, is pinned to a shaft 451 which is supported at each end in the side frames of the machine. The vertical bar 439 has two rearwardly projecting lugs 452 and 453 which cooperate with the lower edge 454 of the back frame 455 to limit the movement of the vertical bar at the "0" and "9" positions.

The indicator wheels are retained in the positions in which they are set by alining arms 456 (Figs. 7 and 8) which are pinned to the shaft 303 and have their free ends 457 formed to engage notches 458 in the segments 446. There is one of these alining arms for each pair of indicators. They are disengaged from the segments at the time of setting the indicators by an oscillating motion of the shaft 303 communicated thereto by an arm 459 (Figs. 8, 12 and 18), the lower end of which carries a laterally projecting stud upon which is loosely mounted a roller 460 cooperating with a groove 461 formed in the side of the disk 336.

Referring to Fig. 1, the four pairs of indicator wheels form two sets of indicators. One set of wheels 449 is arranged to be read from the front of the machine and the other set of wheels 462 from the rear of the machine. The outside indicator wheels of the sets will be moved in unison by the segment arms 446 and 463 which are pinned to the shaft 451. The second indicator wheels are operated in unison by a yoke 464. The third wheels are connected together to move in unison by a yoke 465. While the fourth or special indicator wheels are connected together by a sleeve 466.

In the normal condition of the machine when the indicator wheel stands at zero, the parts are in the positions shown in Figs. 3 and 7, but when any indicator segment 446 is swung in a clockwise direction by an operation of an arm 212 in the manner previously described, the forward end of the link 436 is raised while the pivot 438 is held stationary by engagement of the locking arm 456 with the indicator segment. After the arm 212 is placed according to the key depressed, the locking arm 244 will retain it in this position and the indicator segment locking arm 456 will disengage from the segment. The pin 262 having been raised to a new position now becomes the fulcrum point. The raising of the pivotal point 262 has also raised the link 436 and consequently raised the roller 443, and thus upon continued rotation of the shaft 249 in the direction shown by the arrow the cam 441 will act upon the roller 443 and swing the link 436 on its forward pivot 262, giving a downward movement to the vertical bar 439, thereby swinging the indicator segment in clockwise direction to set the indicator wheel to a position corresponding to the key depressed. As soon as the indicators have thus been set the alining pawls 456 are rocked forwardly to lock the indicators in such positions.

Upon the next operation of the machine if there be no key depressed in this previously operated bank the arm 212 will be returned to its normal position, which will lower the forward end of the link 436, and during the operation of the machine the cam 442 will engage the roller 444 and raise the link 436, restoring the indicator to its normal zero position. If the same key in any bank is depressed during successive operations of the machine the position of the pivotal point 262 will remain unchanged so that the cams 441 and 442 will have no elevating or depressing effect upon the respective rollers, and therefore the indicator will remain in the position in which it was set during the previous transaction. The indicator wheel is moved from one position to another without first returning to zero when different keys are operated during successive operations.

Operation

To enter a record of a cash transaction the amount keys representing the amount of the transaction, together with the "cash" key in the control bank, are depressed, and finally the crank handle 192 is given two rotations, resulting in a rotation of the drive shafts 68 and 249. Rotation of shaft 68 causes the cam 230 (Figs. 6 and 7) to rock the shaft 214 and gears 210 and 211 in a counter-clockwise direction, thereby causing the gears 210 and 211 to rotate and swing the arms 205 and 206 on their pivots and toward each other, differentially adjusting the arm 212. Either pivoted arm may swing toward the other, or they may both swing toward each other, depending upon the key depressed. In the latter case one will move toward the other until it engages the depressed control key when the rotation of the gears 210 and 211 around the segments 208 and 209 causes the other to take up the complement of movement. In this manner the arm 212 is adjusted in a clockwise or counter-clockwise direction, depending upon its previous setting. Movement of the arm 212 has caused the partial gear 261 to rotate and position the type wheel to print a character representing the control key depressed, and has moved the fulcrum pin 262 to a position where it causes the vertical bar 439 to be moved upwardly or downwardly, depending upon its previous position. This movement of the vertical bar swings the segment 446, which in turn rotates the indicator wheel to display a character representing the control key depressed, and in this case it will be the "cash" key.

The depressing of the "cash" key does not move the totalizer differential cam 173 (Fig. 21) from its normal position, so that the amounts represented by the keys depressed will be entered in the totalizer.

At the same time that the elements in the control bank are adjusting themselves according to the control key depressed, the pivoted arms 205 and 206 of the amount banks (Fig. 3) where keys are depressed are being moved until stopped by the depressed keys and differentially position the arms 212, which in turn set up the type wheels and the indicators to positions corresponding to the different keys depressed. As the upper pivoted arms 206 move they will rotate the totalizer wheels an amount equal to the value of the keys depressed, their movement being transmitted to the totalizer wheels by the actuators 269 and coupling pinions 287 (Fig. 9).

In a transaction where the "received-on-account" key of the control bank is depressed in connection with the keys in the amount banks, the items are indicated, printed and entered in the totalizer similar to when the "cash" key is depressed.

In "charge" and "paid out" transactions, the depressing of the "charge" key or the "paid out" key of the control bank will move the totalizer differential cam 173 (Fig. 21) so that the totalizer will not be connected to the actuator mechanism during the operation of the machine but the amount corresponding to the amount keys depressed will be set up by the type wheels and displayed by the indicators.

To subtract an amount from the totalizer, keys corresponding to the amount to be subtracted, and the subtract key, are depressed. In the operation of the machine the subtracting coupling pinions 290 (Figs. 3 and 9) will engage the totalizer gears to connect the actuating segments 270 to the totalizer. As the actuating segment is operated by the lower pivoted arm 205 there will be entered in each totalizer wheel the complement (of 9) of the key depressed in its corresponding bank. The auxiliary or first carrying pawl 298 (Fig. 26) is tripped to engage a tooth in the ratchet wheel 296 and rotates the first or unit wheel one additional space. For example, if the totalizer in which there are five wheels has an accumulation of 00563 and we subtract 352 from this amount, the subtracting actuators will add the complement, which is 99647, giving a result on the wheels of 00210; the first wheel will then be moved one additional space by the auxiliary carrying pawl, making the final result on the totalizer wheels 00211.

To print on record material the total accumulation on the totalizer and leave the totalizer wheels in the zero positions at the end of the operation, the total key is depressed, which automatically locks all the other keys against operation. The detent plate 162 (Fig. 21) will position the differential cam 173 so that during the operation of the machine the totalizer coupling pinions 290 will engage the totalizer wheels and connect the actuating segments 270, operated by the lower pivoted arms 205, with the totalizer wheels. The upper pivoted arm 206 (Fig. 24) being held by the latch 89 will cause the lower pivoted arm to move upwardly until the totalizer wheel rotates to the "9" position, at which point the totalizer wheel is stopped by the lever 412 (Fig. 29) and the latch 89 releases the upper pivoted arm 206 allowing it to travel downwardly until it contacts the lower arm. The movement of both pivoted arms has moved the arm 212 to set the type wheels to print an amount corresponding to the amount accumulated on the totalizer. After the type wheels are set in positions and locked by the arms 244 (Fig. 7) the coupling pinions 290 are disengaged from the totalizer gears, leaving all the totalizer wheels set in the "9" positions. The auxiliary or first transfer pawl 298 (Fig. 26), having been tripped by the pin 325 contacting the trip pawl 313, will rotate the first wheel one division to the zero position causing the transfer pawls to carry across the entire five wheels, which places the totalizer at zero at the completion of the operation of the machine.

In a sub-total operation the amount accumulated on the totalizer is printed on record material and is retained in the totalizer wheels at the completion of the operation. The sub-total key is depressed, which locks all other keys against operation. The operation of the machine is practically the same as during a total operation up to the point where the type printing wheels are set and locked for printing. At this point the coupling pinions 290 (Fig. 9) do not disengage as in a total operation, but remain in engagement with the totalizer gears until the totalizer wheels are returned to the postions they occupied at the beginning of the operation.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of pivoted members complementarily and differentially movable in opposite directions, manipulative devices for controlling said members, operating means for moving said members to a position controlled by one of the manipulative devices and returning them again to normal position, a totalizer, a pair of totalizer actuators positively operated by said members, and means for connecting either actuator to the totalizer for operation.

2. In a machine of the class described, the combination of a totalizer including rotatable elements, pivoted members complementarily and differentially movable in opposite directions, separate actuators positively connected with each of said members for operating a rotatable element in a common direction, manipulative devices for controlling said members, and means for positively connecting the actuators with their totalizer elements for operation.

3. In a machine of the class described, the combination of a totalizer for adding and subtracting items, an actuator for operating the totalizer to add items, a separate actuator for operating the totalizer to subtract items, pivoted members movable in opposite directions, means for positively connecting one pivoted member with the adding actuator, means for connecting the other pivoted member with the subtracting actuator, and means for operating said members in opposite directions to a pre-selected differential stop.

4. In a machine of the class described, the combination of a pair of complementary movable pivoted members, a pair of totalizer actuators positively operated by said members, a totalizer adapted to be operated by either actuator, and means for connecting either actuator to said totalizer.

5. In a machine of the class described, the combination of a pair of complementarily movable pivoted members, a pair of totalizer actuators positively operated by said members, a totalizer adapted to be operated by either actuator, a pair of coupling devices for connecting the actuators to the totalizer, and means for selecting either coupling device.

6. In a machine of the class described, the combination of a totalizer involving wheels, actuators for rotating the wheels of the totalizer, means for preventing a retrograde movement of said totalizer wheels, a device for coupling said actuators with their rotatable totalizer wheels, and means controlled by said coupling device to disable said first-mentioned means for permitting a retrograde movement of said totalizer wheels.

7. In a machine of the class described, a totalizer element comprising groups of wheels, a certain wheel of each group being free to rotate in either direction, another wheel of each group being normally restrained from moving in one direction, devices for coupling the wheels which normally rotate in one direction with wheels rotating in either direction, and means controlled by the coupling devices to render the normally restrained wheels, effective to rotate in either direction.

8. In a machine of the class described, a totalizer element comprising groups of wheels, a certain wheel of each group being rotatable in either direction, another wheel of each group normally rotatable in one direction, actuators engaging said wheels rotatable in either direction, devices for coupling said wheels normally rotatable in one direction with said wheels rotatable in either direction, and means controlled by certain coupling devices to render the wheels normally rotatable in one direction effective to rotate in either direction.

9. In a machine of the class described, the combination of a totalizer, complementarily and differentially movable totalizer actuators, one of which is normally free, means for normally locking the other actuator, and means controlled by the totalizer for unlocking said latter actuator.

10. In a machine of the class described, the combination of a totalizer, differentially movable totalizer actuators complementarily movable with respect to each other, means for normally locking one of said actuators, means for operating the other actuator an extent determined by the accumulated amount in the totalizer, and means controlled by the totalizer for releasing the locking means of the normally locked actuator.

11. In a machine of the class described, the combination of a totalizer, differentially movable totalizer actuators complementarily movable with respect to each other, means for normally locking one of said actuators, means for operating the other actuator an extent determined by the accumulated amount in the totalizer, means controlled by the totalizer for moving said locking means to unlocking position, and means cooperating with said locking means for arresting said totalizer.

12. In a machine of the class described, the combination of a totalizer, differentially movable totalizer actuators complementarily movable with respect to each other, means for normally locking one of said actuators, means for operating the other actuator an extent determined by the accumulated amount in the totalizer, means adapted to be actuated by the totalizer for releasing said locking means, said releasing means being normally inoperative during a totalizing operation, and manipulative means for rendering said releasing means operative upon actuation of the totalizer.

13. In a machine of the class described, the combination of a totalizer, differentially movable totalizer actuators complementarily movable with respect to each other, means for normally locking one of said actuators, means for operating the other actuator an extent determined by the accumulated amount in the totalizer, manipulatively controlled means, and means carried by the locking means and cooperating with the totalizer and manipulatively controlled means for moving said locking means to unlocking position.

14. In a machine of the class described, the combination of a totalizer, differentially movable totalizer actuators complementarily movable with respect to each other, means for normally locking one of said actuators, means for operating the other actuator an extent determined by the accumulated amount in the totalizer, means adapted to cooperate with the totalizer and the locking means to move the latter to unlocked position, said cooperating means being normally ineffective, and means for rendering said cooperating means effective.

15. In a machine of the class described, the combination of a totalizer, an operating mechanism, means for connecting said mechanism to said totalizer, a transfer pawl and a holding pawl for said totalizer, an invariably movable means, a device for moving said pawls into inoperative positions, and means controlled by the connecting means for moving said device into a position to be actuated by said invariably movable means.

16. In a machine of the class described, the combination of a totalizer including a transfer pawl, differentially movable totalizer actuating means, means for operatively connecting said actuating means to the totalizer, and means actuated by said last mentioned means for tripping said transfer pawl as a connection is being effected.

17. In a machine of the class described, the combination of a totalizer, amount determining means, a pair of totalizer actuators controlled by said amount determining means and movable complementarily in the same direction, and means for selecting either actuator for operating the totalizer.

18. In a machine of the class described, the combination of an operating mechanism, a totalizer, a totalizer actuator driven by said operating mechanism, means to operatively connect the actuator to the totalizer, a plurality of devices driven by said operating mechanism for moving said connecting means into operative position, and manipulative means for controlling the effectivity of said devices.

19. In a machine of the class described, the combination of a totalizer element including a transfer pawl and a holding pawl, an operating device for said transfer pawl, manipulative means, and means under control of the manipulative means and actuated by said operating device for moving said pawls to inoperative positions.

20. In a totalizer, a transfer pawl, a pawl for controlling the effectivity of said transfer pawl, means for moving one of said pawls into an inoperative position, and means for transmitting movement from said operated pawl to the other pawl to move the latter to inoperative position.

21. In a machine of the the class described, the combination of a totalizer, sets of totalizer actuators, means normally disconnected from the totalizer and adapted to be actuated to connect said actuators to the totalizer, and means for selectively actuating said connecting means to connect one or the other of said sets of actuators to the totalizer.

22. In a machine of the class described, the combination of a totalizer, sets of totalizer actuators, corresponding sets of means normally disconnected from the totalizer, and adapted to be moved to connect the actuators to the totalizer, mechanism for selectively moving said sets of connecting means to couple the actuators with the totalizer, and manipulative means for controlling the operation of said mechanism.

23. In a machine of the class described, the combination of a totalizer, sets of totalizer actuators, means to control the effectivity of the actuators and shiftable means adapted to be moved differentially to move the controlling means into a position of operative relation with either set of actuators to couple the selected set with the totalizer, and manipulative means for predetermining the movement of said shiftable means.

24. In a machine of the class described, the combination of a printing mechanism, a totalizer comprising a single set of gear wheels, means connected to the totalizer and printing mechanism for adjusting the printing mechanism in accordance with the amount in the totalizer and under control of the totalizer as the totalizer is moved in an additive direction, and means for actuating the totalizer.

25. In a machine of the class described, the combination of totalizer elements, means for turning the totalizer elements forwardly to nine in total taking operations, transfer devices means for tripping the transfer devices for turning the elements to zero, and means for re-entering the amounts on the totalizer elements by turning the elements in the additive direction.

26. In a machine of the class described, the combination of totalizer elements, means for turning the totalizer elements forwardly to nine in total taking operations, means for turning said elements forwardly to zero, and means for re-entering the amounts on the totalizer elements by turning the elements in the additive direction.

In testimony whereof I affix my signature.

THOMAS CARROLL.